United States Patent [19]

von Reth et al.

[11] 3,994,708

[45] Nov. 30, 1976

[54] METHOD OF PRODUCING A GLASS TRANSMISSIVE TO ULTRAVIOLET RADIATION

[75] Inventors: Peter Herman von Reth; Henricus Cornelis van Velzen, both of Eindhoven, Netherlands

[73] Assignee: U.S. Philips Corporation, New York, N.Y.

[22] Filed: May 7, 1975

[21] Appl. No.: 575,126

[30] Foreign Application Priority Data
May 15, 1974 Netherlands ................. 7406495

[52] U.S. Cl. .................... 65/32; 65/134; 65/136; 106/52
[51] Int. Cl.² ............................... C03B 5/16
[58] Field of Search ............ 65/134, 136, 32; 106/52

[56] References Cited
UNITED STATES PATENTS

| 3,022,181 | 2/1962 | Connelly ................. 106/52 |
| 3,589,885 | 6/1971 | Monks .................... 65/134 |

Primary Examiner—S. Leon Bashore
Assistant Examiner—Frank W. Miga
Attorney, Agent, or Firm—Frank R. Trifari; Daniel R. McGlynn

[57] ABSTRACT

Method of producing a glass which is transmissive to ultraviolet radiation, comprising the steps of:

providing a glass batch mixture consisting of, in per cent by weight:

| | | | |
|---|---|---|---|
| $SiO_2$ | 61 – 70 | CaO | 0 – 6 |
| $B_2O_3$ | 0.5 – 3.5 | BaO | 4 – 15 |
| $Na_2O$ | 8 – 10 | MgO | 0 – 5 |
| $K_2O$ | 9 – 12 | $Al_2O_3$ | 1 – 5 | together with iron impurities;

melting said glass batch mixture; and adding to said mixture a refining agent which consists of a sulfate to which an organic reducing agent selected from the group consisting of sugar, carbon, sawdust, and charcoal has been added for maintaining the iron impurities in divalent form, and reducing the number of gas occlusions, the resulting seed-free glass having a tranmissivity of 65% per mm thickness to radiation in the range around 253.7nm.

2 Claims, No Drawings

METHOD OF PRODUCING A GLASS TRANSMISSIVE TO ULTRAVIOLET RADIATION

BACKGROUND OF THE INVENTION

The invention relates to a method of producing glass transmissive to ultraviolet radiation.

The class of glass compositions with which the present invention is lies within the range having the following limits, expressed in percent by weight:

| | | | | |
|---|---|---|---|---|
| $SiO_2$ | 61 – 70 | CaO | 0 – 6 | |
| $B_2O_3$ | 0.5 – 3.5 | BaO | 4 – 15 | together |
| $Na_2O$ | 8 – 10 | MgO | 0 – 5 | 6 – 15 |
| $K_2O$ | 9 – 12 | $Al_2O_3$ | 1 – 5 | |

These glasses are characterized, in particular, by a high transmissivity to ultraviolet radiation of wavelength 253.7 nm, so that they can be used as envelopes for lamps which emit what is generally referred to as germicidal radiation.

To obtain a high transmissivity to ultraviolet radiation the glasses must be produced from highly pure raw materials. In addition, an organic reducing agent is added to the mixture in order to maintain the iron, which is a substantially inevitable impurity, in the divalent form, since trivalent iron has a strong absorption for ultraviolet radiation. During the irradiation of the glass by ultraviolet radiation the transmissivity of the glass to this radiation gradually decreases over time because of solarisation in which ferrous ions are gradually reconverted to ferric ions.

In the prior art production method of this class of glasses no refining agent was used, since the usual refining agents, arsenic trioxide and antimony trioxide, show strong absorption in the ultraviolet range. The quality of the glass produced in this manner is not very high, and it contains a large number of gas occlusions or "seeds".

SUMMARY OF THE INVENTION

According to the invention it has been found that the molten mixture for producing glass of a composition within the above-defined range can excellently be refined by means of a mixture comprising a sulfate or a chloride to which an organic reducing agent is added. It has surprisingly been found that the glass produced in this manner shows substantially no solarisation after irradiation by ultraviolet light.

It should be mentioned that this refining agent combination is described, for example, in U.S. Pat. No. 3,589,885, however, relates to glass compositions of an entirely different type in which ultraviolet transmission is not of importance.

The present invention provides a method of producing a glass which is transmissive to ultraviolet radiation, comprising the steps of: providing a glass batch mixture consisting of, in per cent by weight:

| | | | |
|---|---|---|---|
| $SiO_2$ | 61 – 70 | CaO | 0 – 6 |
| $B_2O_3$ | 0.5 – 3.5 | BaO | 4 – 15 |
| $Na_2O$ | 8 – 10 | MgO | 0 – 5 |
| $K_2O$ | 9 – 12 | $Al_2O_3$ | 1 – 5 | melting said glass batch mixture; and adding to said mixture a refining agent which consists of a sulfate to which an organic reducing agent has been added, the resulting seed-free glass having a transmissivity of 65% per mm thickness to radiation in the range around 253.7nm.

A mixture comprising sand, boric acid, sodium carbonate, potassium carbonate, aluminium oxide and barium carbonate for obtaining glass of the following composition, expressed in percent by weight:

| | | | |
|---|---|---|---|
| $SiO_2$ | 68.8 % | $K_2O$ | 10.9 % |
| $B_2O_3$ | 2.9 % | BaO | 6.8 % |
| $Na_2O$ | 9.1 % | $Al_2O_3$ | 1.5 % | was melted and refined by means of a mixture of 1 kg of $Na_2SO_4$ and 0.6 kg of sugar per 100 kg of glass. The sugar may be replaced by carbon, sawdust or charcoal may be used. The resulting seed-free glass had a transmissivity of 65 % per mm thickness in the range around 253.7 nm. This transmissivity remained at the same level after irradiation for 15 hours by an ultraviolet lamp having a high emission at the said wavelength.

The corresponding non-refined glass has an initial transmissivity of 72 % which, however, falls to 65 % after irradition for 15 hours. This glass contains a larger number of seeds.

Other glasses which can be refined with similar success are the following (expressed in percent by weight):

| | | | | | |
|---|---|---|---|---|---|
| (1) | $SiO_2$ | 62.1 | BaO | 14.2 | |
| | $B_2O_3$ | 2.1 | $Al_2O_3$ | 2.2 | |
| | $Na_2O$ | 8.7 | F | 0.2 | |
| | $K_2O$ | 10.6 | | | |
| (2) | $SiO_2$ | 63.5 | CaO | 5.2 | |
| | $B_2O_3$ | 1.0 | BaO | 4.5 | |
| | $Na_2O$ | 8.5 | MgO | 3.7 | |
| | $K_2O$ | 9.4 | $Al_2O_3$ | 4.2 | |

What is claimed is:

1. Method of producing a glass which is transmissive to ultraviolet radiation, comprising the steps of:

providing a glass batch mixture consisting of, in per cent by weight:

| | | | |
|---|---|---|---|
| $SiO_2$ | 61 – 70 | CaO | 0 – 6 |
| $B_2O_3$ | 0.5 – 3.5 | BaO | 4 – 15 |
| $Na_2O$ | 8 – 10 | MgO | 0 – 5 |
| $K_2O$ | 9 – 12 | $Al_2O_3$ | 1 – 5 | together with iron impurities;
melting said glass batch mixture; and
adding to said mixture a refining agent which consists of a sulfate to which an organic reducing agent selected from the group consisting of sugar, carbon, sawdust, and charcoal has been added for maintaining the iron impurities in divalent form, and reducing the number of gas occlusions, the resulting seed-free glass having a transmissivity of 65% per mm thickness to radiation in the range around 253.7nm.

2. Method of producing a glass which is transmissive to ultraviolet radiation, comprising the steps of:
providing a glass batch mixture consisting of, in per cent by weight:

| | | | |
|---|---|---|---|
| SiO$_2$ | 61 – 70 | CaO | 0 – 6 |
| B$_2$O$_3$ | 0.5 – 3.5 | BaO | 4 – 15 |
| Na$_2$O | 8 – 10 | MgO | 0 – 5 |
| K$_2$O | 9 – 12 | Al$_2$O$_3$ | 1 – 5 | together with iron impurities;
melting said glass batch mixture; and
adding to said mixture a refining agent which consists of a chloride to which an organic reducing agent selected from the group consisting of sugar, carbon, sawdust, and charcoal has been added for maintaining the iron impurities in divalent form, and reducing the number of glass occlusions, the resulting seed-free glass having a transmissivity of 65% per mm thickness to radiation in the range around 253.7nm.

* * * * *

UNITED STATES PATENT AND TRADEMARK OFFICE
CERTIFICATE OF CORRECTION

PATENT NO. : 3,994,708
DATED : November 30, 1976
INVENTOR(S) : PETER HERMAN VON RETH ET AL It is certified that error appears in the above–identified patent and that said Letters Patent are hereby corrected as shown below:

Column 1, line 53, ", however" should be --. This reference, however--

Signed and Sealed this

Twenty-sixth Day of April 1977

[SEAL]

Attest:

RUTH C. MASON
Attesting Officer

C. MARSHALL DANN
Commissioner of Patents and Trademarks